US 6,748,477 B1

(12) United States Patent
Benson et al.

(10) Patent No.: US 6,748,477 B1
(45) Date of Patent: Jun. 8, 2004

(54) MULTIPLE-PATH INTERFACE CARD FOR INTERFACING MULTIPLE ISOLATED INTERFACES TO A STORAGE SYSTEM

(75) Inventors: Anthony J Benson, Roseville, CA (US); James J. deBlanc, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 09/811,193

(22) Filed: Mar. 17, 2001

(51) Int. Cl.[7] .............................................. G06F 13/00
(52) U.S. Cl. ...................................... 710/305; 710/315
(58) Field of Search ............................... 710/305–317; 361/683–686; 711/114

(56) References Cited

U.S. PATENT DOCUMENTS

| | | | | |
|---|---|---|---|---|
| 5,239,632 A | * | 8/1993 | Larner | 710/314 |
| 5,978,877 A | * | 11/1999 | Strevey | 710/314 |
| 6,000,020 A | * | 12/1999 | Chin et al. | 711/162 |
| 6,055,582 A | * | 4/2000 | Pascarella et al. | 710/14 |
| 6,157,974 A | * | 12/2000 | Gasparik | 710/302 |
| 6,185,651 B1 | * | 2/2001 | Monia et al. | 710/240 |
| 6,408,343 B1 | * | 6/2002 | Erickson et al. | 710/15 |
| 6,430,686 B1 | * | 8/2002 | Cargemel et al. | 713/1 |
| 6,567,879 B1 | * | 5/2003 | Benson et al. | 710/305 |

* cited by examiner

*Primary Examiner*—Xuan M. Thai (57) ABSTRACT

An interface card includes a plurality of data paths with each data path extending from a first connector to a second connector. The second connector for coupling to a bus backplane. One or more of the data paths include a transceiver that accesses signals in a first bus signaling type, an isolator/converter that mutually isolates the plurality of data paths and that converts signals from the first bus signaling type to a second bus signaling type, and a bridge coupled from a first data path to a second data path of the plurality of data paths. The bridge is capable of controlling communication of signals between the first data path and the second data path.

28 Claims, 8 Drawing Sheets

FIG. 13

MULTIPLE-PATH INTERFACE CARD FOR INTERFACING MULTIPLE ISOLATED INTERFACES TO A STORAGE SYSTEM

CROSS-REFERENCE

The present invention is related to subject matter disclosed in the following co-pending patent applications:
1. U.S. patent application Ser. No. 09/801,194 entitled, "Redundant, High-Availability Storage System" naming Anthony J. Benson and James J. deBlanc as inventors and filed on even date herewith.
2. U.S. patent application Ser. No. 09/811,194 entitled, "Data Corruption Avoidance on a Backplane Bus Adapted to Receive Bus Controller Cards of Different Types", naming Anthony J. Benson and Patrick McGoey as inventors and filed on even date. herewith.
3. U.S. patent application Ser. No. 09/811,194 entitled, "DIP Switch Configuration for Increased Usability with Multiple Cards", naming Anthony J. Benson, Chadi Theodossy, and Joanna Baisden as inventors and filed on even date herewith.
4. U.S. patent application Ser. No. 09/811,192 entitled, "Circuit for Switching One or More HVD Transceivers", naming Anthony J. Benson as inventor and filed on even date herewith.
5. U.S. patent application Ser. No. 09/810,963 entitled, "Management of Communication Bus Resets", naming Anthony J. Benson, James L. White, and Dovard K. Howard as inventors and filed on even date herewith.
6. U.S. patent application Ser. No. 09/811,196 entitled, "Communication Bus Controller including Designation of Primary and Secondary Status According to Slot Position", naming Anthony J. Benson, James L. White, and Dovard K. Howard as inventors and filed on even date herewith.

BACKGROUND OF THE INVENTION

While business growth has been robust in the last few years, one of the largest areas of growth in many businesses has been the continuing increase in data handling and storage. With the increase in utilization of large database applications, improved processing power by single- and multiple-processor systems, and migration of multimedia applications into mainstream office tools, businesses and organizations have greatly increased their need for large amounts of storage.

Large volumes of data are only useful if the data can be accessed quickly and reliably. Increased reliability is commonly achieved by usage of redundant elements and by increasing availability. In high-availability applications, data must be constantly available with minimal planned and unplanned downtime. High availability is measured at the system level and quantified as the percentage of time the system is in a state to do useful work.

SUMMARY OF THE INVENTION

What is needed is an interface architecture that promotes reliability through usage of redundant, high-availability components.

A multiple-path interface card supports access to multiple buses on a backplane. In one example, a single two-path interface card supplies access to two buses on a backplane and has two connectors. Each connector has an isolated path to each bus on the backplane and termination on the card. Isolation of the connectors allows a user to disconnect cables from one connector without affecting the other connector.

In accordance with one aspect of the present invention, an interface card includes a plurality of data paths with each data path extending from a first connector to a second connector. The second connector couples to a bus backplane. One or more of the data paths include a transceiver that accesses signals in a first bus signaling type, an isolator/converter that mutually isolates the plurality of data paths and that converts signals from the first bus signaling type to a second bus signaling type, and a bridge coupled from a first data path to a second data path of the plurality of data paths. The bridge is capable of controlling communication of signals between the first data path and the second data path.

Various types of data paths include data buses, single serial data lines, and multiple independent serial data lines.

In accordance with another aspect of the present invention, a dual-channel bus controller card includes a first data path extending from a host end to a backplane end and a second data path extending from the host end to the backplane end. The first data path includes a first high density connector coupled to the host end of the first data path, a first transceiver coupled to the first data path adjacent to the first high density connector, a first isolator/converter coupled to the first data path adjacent to the first transceiver, and a first backplane connector coupled to the backplane end of the first data path and adjacent to the first isolator/converter. The second data path includes a second high density connector coupled to the host end of the second data path, a second transceiver coupled to the second data path adjacent to the second high density connector, a second isolator/converter coupled to the second data path adjacent to the second transceiver, and a second backplane connector coupled to the backplane end of the second data path and adjacent to the second isolator/converter.

DESCRIPTION OF THE EMBODIMENT(S)

Although the illustrated examples depict interfaces to a Small Computer System Interface (SCSI) bus, and one or more host computers, other systems in accordance with other embodiments of the present invention may use other buses and/or serial bit stream data connections and host equipment.

Figure 1:
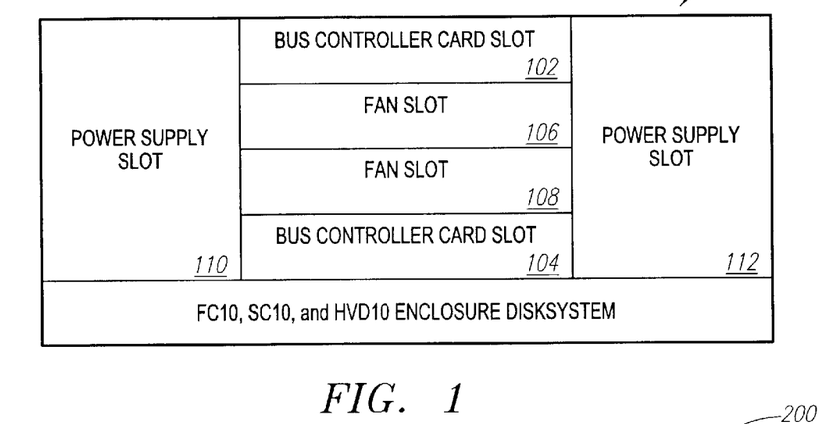
FIG. 1 is a highly schematic block diagram that illustrates an example of a Small Computer System Interface (SCSI) disk enclosure for a redundant, high availability storage system.

Referring to FIG. 1, a highly schematic block diagram illustrates an example of a Small Computer System Interface (SCSI) disk enclosure 100 for a redundant, high availability storage system. The SCSI disk enclosure 100 has multiple bus controller card (BCC) slots, for example two BCC slots 102 and 104, for connection to multiple SCSI buses. The SCSI disk enclosure 100 allows independent access to each SCSI bus and a capability to remove one bus controller card without affecting the operation of another bus controller card within the SCSI disk enclosure 100.

The illustrative SCSI disk enclosure 100 has two BCC slots 102 and 104 for holding two bus controller cards. Two fan slots 106 and 108, and two power supply slots 110 and 112 supply redundancy with respect to cooling and power within the SCSI disk enclosure 100. The SCSI disk enclosure 100 supports high availability through the application of hot-pluggable, user-replaceable, and optionally redundant BCCs, fans, and power supplies.

A system including one or more of the SCSI disk enclosures 100 and a suitable number of bus connector cards has a structure that supports one or more of several aspects of a redundant, high-availability storage system. The system supports an increased number of isolated bus connections to the SCSI bus. The structure permits a host system to switch access paths to the SCSI disk enclosure 100 and utilize an alternate bus controller card when a currently-used bus controller card encounters problems.

The structure supports an increase in the number of high-availability configurations for a single disk enclosure. High-availability is attained by a redundant structure in which components including power supplies, fans, bus controller cards, and disk storage modules are fully redundant. A typical type of storage module is a storage disk module. The components are "hot-swappable", facilitating access for replacement or reconfiguration while the system remains operational. The storage system remains operational and data remains available for access even during replacement of system components with no system downtime for repair.

The redundant, high-availability system structure supports monitoring and reporting functionality for a single disk disclosure using two bus controller cards with on-card monitoring and reporting circuitry, functioning in conjunction with monitoring software that is operable on a host system. The host system can be configured to perform various monitoring or control operations utilizing the redundant, high-availability aspects of the storage system. A bus controller card can be disconnected from the bus for performance of self-diagnostic operations. The system can identify a failing component within the SCSI disk enclosure 100. The system can detect and shut down a failing component within the SCSI disk enclosure 100, permitting continuing operation of other components. The system can report to the host the failure of a component within the SCSI disk enclosure 100 and continue operation with reduced capabilities until repairs are made. The system can switch operations over to a backup bus controller card (BCC) if a primary BCC is in a monitor mode.

The architecture of the SCSI disk enclosure 100 permits two interface cards to be placed in the storage system, allowing independent removal of each card.

Figure 2:
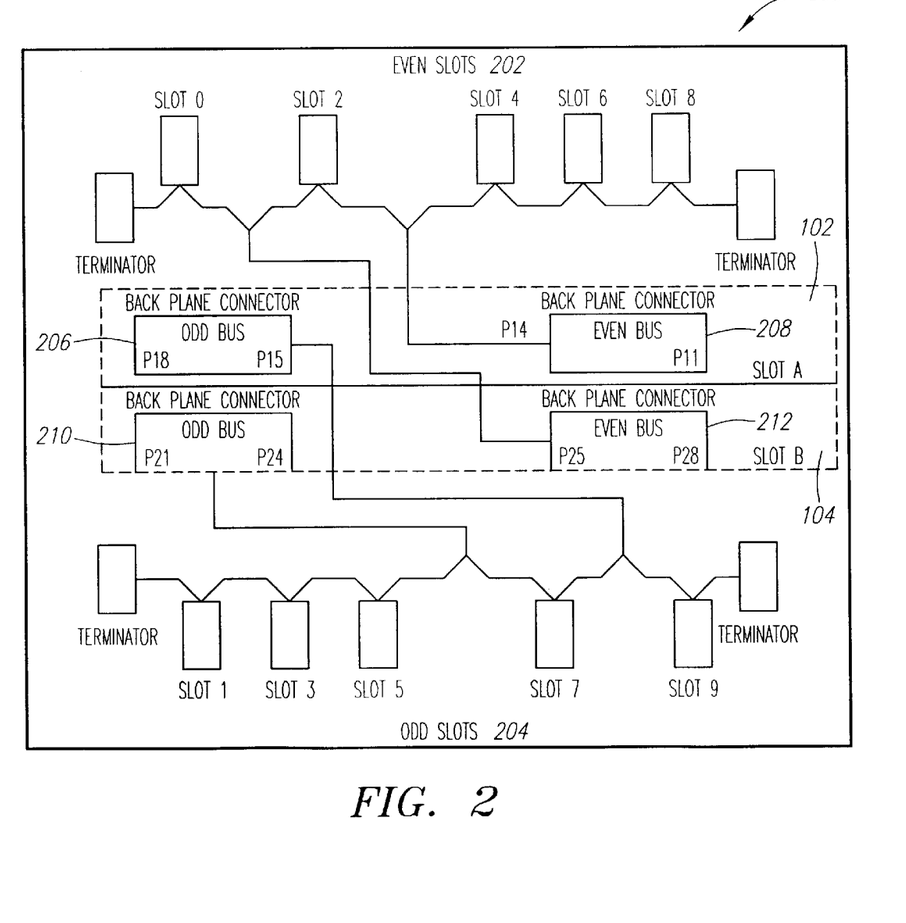
FIG. 2 is a schematic block diagram that illustrates a suitable backplane architecture that allows independent access to two SCSI buses supported on a mid-plane for even bus slots and odd bus slots.

Referring to FIG. 2, a schematic block diagram illustrates a suitable backplane architecture 200 that allows independent access to two SCSI buses supported on a mid-plane for each bus slot of even bus slots 202 and odd bus slots 204. The backplane architecture 200 includes two bus controller card slots A 102 and B 104, each having two backplane connectors of left side backplane connectors 206 and 210, and right side backplane connectors 208 and 212. Connections to the odd bus slots 204 are on the left side 206 and 210 of the backplane. Connections to the even bus slots 202 are on the right side 208 and 212 of the backplane. The position of the BCC in bus controller card slot A 102 is inserted in an orientation 180° from the orientation of the BCC inserted into the bus controller card slot B 104. Because the bus controller cards are rotated 180° when moved from BCC slot to adjacent BCC slot, the backplane connector associated with the even bus 222 when the BCC is inserted in BCC slot B 104 is connected to the odd bus 224 when inserted into BCC slot A 102.

Figure 3:
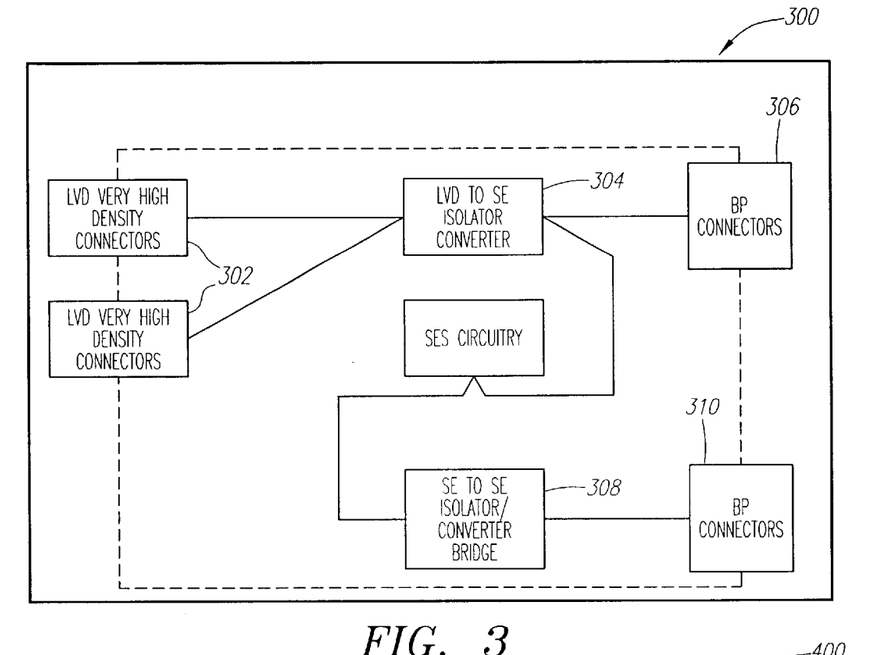
FIG. 3 is a schematic block diagram that illustrates, for purpose of comparison, a bus architecture that does not have the redundancy and high-availability capability.

Referring to FIG. 3, a schematic block diagram illustrates, for purpose of comparison, a bus architecture 300 that does not have the redundancy and high-availability capability of the illustrative system depicted in FIGS. 1 and 2. The bus architecture 300 does not allow independent access to each of the SCSI buses so that two bus controller cards are needed to access the two SCSI buses. Very high density connectors (VHDC) 302 on each BCC are tied together, making the two BCC interdependent but permitting external termination. A BCC in a top backplane connector 306 connects to the even bus and a BCC in a bottom backplane connector 310 connects to the odd bus. Each BCC can be operated in a split-bus configuration with only a single bus being accessible to each card, for example, to access a maximum of five disks. Alternatively, each BCC can be configured in a bridge mode in which the two buses are interconnected and a maximum of ten buses, for example, can be accessed.

The bus architecture 300 requires an external terminator if a BCC is at the end of the bus. An isolator/converter chip 304 or 308 is used to convert a low voltage differential (LVD) signal to single-ended, which is compatible with the backplane. LVD signaling filters common mode noise by taking the difference of two low-voltage signals.

The design of the bus architecture 300 allows daisy chaining using standard SCSI cables.

Figure 4:
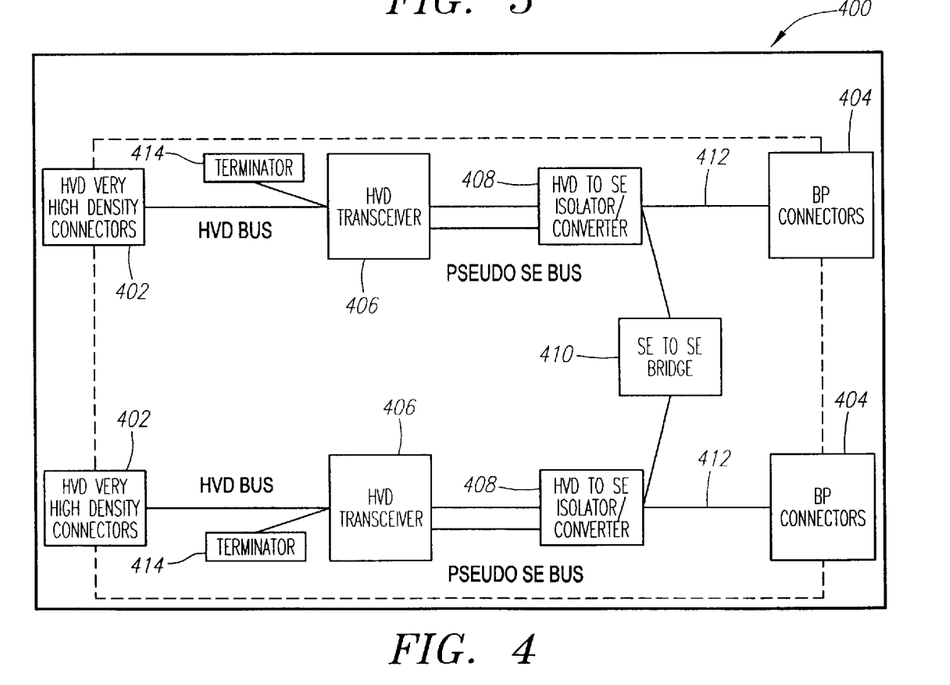
FIG. 4 is a schematic block diagram that shows an example of a high voltage differential (HVD) bus architecture that attains high redundancy and high availability.

Referring to FIG. 4, a schematic block diagram illustrates an example of a high voltage differential (HVD) bus architecture 400 that attains high redundancy and high availability. HVD supports data rates up to 20 Mbytes/sec in Fast Wide mode, or up to 40 Mbytes/sec in Ultra mode. A single HVD bus controller card permits independent access to each of the SCSI buses on the mid-plane. The two SCSI buses can be bridged together to allow host systems connected to each of two high-density, for example 68-pin, connector 402 access to all drives connected onto both SCSI buses. In the illustrative bus architecture 400, each high-density connector 402 is coupled to backplane connectors 404 via HVD transceivers 406 and HVD to single-ended (SE) converters 408. Single-ended signaling is a type of SCSI signaling that uses a single driver and receiver per signal. SE wide (16 bits) with Fast SCSI supports data rates up to 20 Mbytes/sec. SE Wide with Ultra SCSI supports data rates up to 40 Mbytes/sec. The HVD transceivers 406 and HVD to single-ended (SE) converters 408 operate to expand and convert the bus from HVD to SE.

In the HVD bus architecture 400, only a single BCC is necessary to access both of two SCSI buses connected to the backplane by the backplane connectors 404. The illustrative architecture has only sufficient space for a total of two HVD high density connectors 402 on the card and each connector 402 has an isolated path 412 to each bus on the backplane so that termination 414 is present on the card. A SE to SE bridge 410 connects the isolated two paths and controls communication between the paths 412. A suitable isolator is a SYM53C140 Ultra2 SCSI Bus Expander chip supplied by LSI Logic Corp. of Milpitas, Calif. The SYM53C140 Ultra2 SCSI Bus Expander connects single-ended (SE) Ultra, Low-Voltage Differential (LVD) Ultra2 or High-Voltage Differential (HVD) peripherals in any combination.

The SE to SE bridge 410 is used to configure the bus in either a full-bus or split-bus configuration. Isolation of the data paths 412 permits users to disconnect cables from one connector 402 without affecting signals on the other connector 402, and allows cable lengths to be increased since the SE to SE bridge resynchronizes and resends all signals. Termination can be enabled or disabled, depending on the desired configuration.

Internal termination 414 replaces the external termination that is required for non-isolated architectures. The internal termination 414 remains functional if access to the SCSI bus is denied due to improper configuration or even if power is terminated to the entire HVD disk system enclosure. Internal termination 414 can be disabled via a DIP switch (not shown) on a bus controller card. The internal termination 414 is applied for each connector 402. Termination 414 is operational even when the SCSI disk enclosure 100 shown in FIG. 1 is powered-off, reducing any requirement for in-line termination imposed for high availability configurations.

Whether the HVD bus system is configured in split bus mode or full bus mode, connections made to the HVD BCC can be removed or disabled without affecting the other connection.

The two independent bus paths of the bus controller card 400 and selective isolation by the SE to SE bridge 410 allow connections to each front-end connector to be removed or added without disturbing functionality of connections to the other front-end connector.

Figure 5:
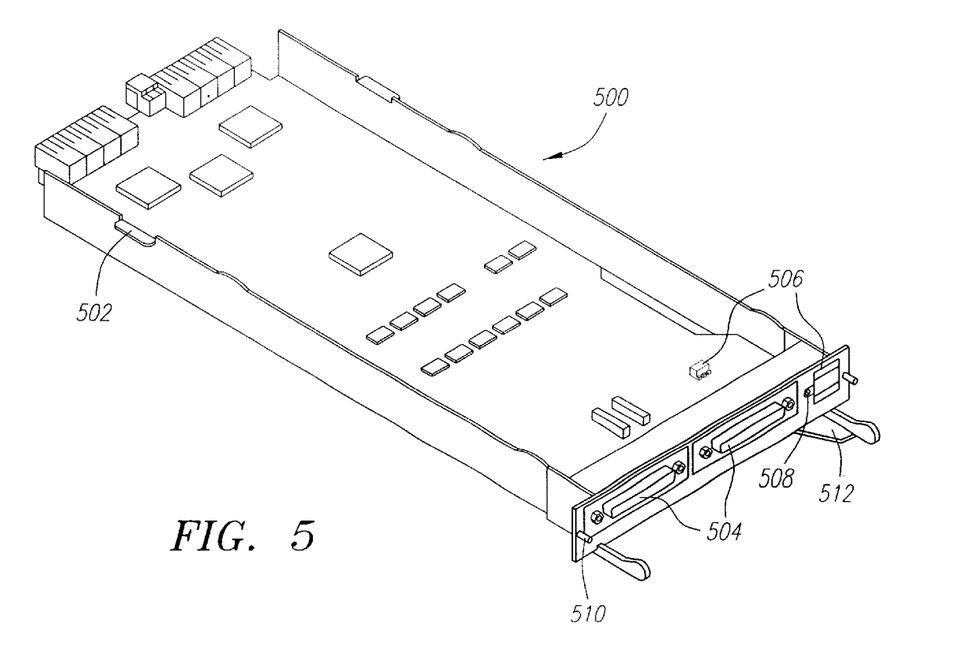
FIG. 5 is a pictorial diagram illustrating a bus controller card (BCC).

Referring to FIG. 5, a pictorial diagram illustrates a bus controller card (BCC) 500, an electrical assembly in an open metal tray 502. The BCC 500 plugs into the top or bottom horizontal slot 102 or 104 shown in FIG. 1 in the SCSI disk enclosure 100. The BCC 500 is a communication path from dual HVD host connections to SE buses inside a storage system. Each SCSI port 504 is connected to one of two SE buses on the backplane. In full-bus mode, the buses are bridged to form a single bus of multiple disk modules. Both ports are on the same bus. In split-bus mode, port A is on one bus with odd-numbered slots, and port B is on a separate bus with even-numbered slots. Dual BCCs add redundancy and double the number of hosts that can be attached to the bus. The BCC on the bottom slot is typically the primary BCC if both cards are installed when the disk system is powered. Otherwise, the card first installed is the primary BCC. The primary BCC controls bus structure, addressing, and other options. If the primary BCC fails and is removed, the second BCC assumes the primary role. DIP switches 506 on the front of the BCC determine full-bus or split-bus mode, high/low bus addressing, and bus termination. Five internal DIP switches 506 specify automatic bus reset after a power failure or disk insertion.

The BCC 500 includes LEDs 508 indicating BCC status, bus mode, and bus activity. The BCC 500 also includes locking screws 510, and cam levers 512. BCC circuitry performs various functions including bus configuration, bus isolation, expansion and conversion of the bus from HVD to SE, system fault detection, detection of BCC configuration faults, and generation of disk addresses. In one example, the internal bridge 410 depicted in FIG. 4 can be a SYM53C140 Ultra2 SCSI Bus Expander chip that includes control and monitoring elements for implementing various configuration, isolation and diagnostic functions. The internal bridge 410 can build a table of information, such as SDTR and WDTR information, relating to devices on the bus in on-chip memory. In single-ended mode, the internal bridge 410 can perform active negation on bus drivers and input signal filtering on receivers. The internal bridge 410 can include LVD DIFFSENS receivers that detect the voltage level on the A side or the B side DIFFSENS lines to determine the transmission mode used by the buses. LVD DIFFSENS receivers are capable of detecting the voltage level of incoming SCSI signals to determine whether the attached device is a single-ended, LVD, or HVD device. The internal bridge 410 can support dynamic transmission mode changes by notifying initiators of changes in transmission mode on A side or B side segments via SCSI bus RESET. DIFFSENS line is used to detect a valid mode switch on the bus segments.

After the DIFFSENS state is present for a prescribed duration, the internal bridge 410 can generate a bus reset on the opposite bus from the bus that originally changed in mode. Initiators renegotiate synchronous transfer rates with each device on that segment to ensure a valid bus segment for that mode.

Figure 6:
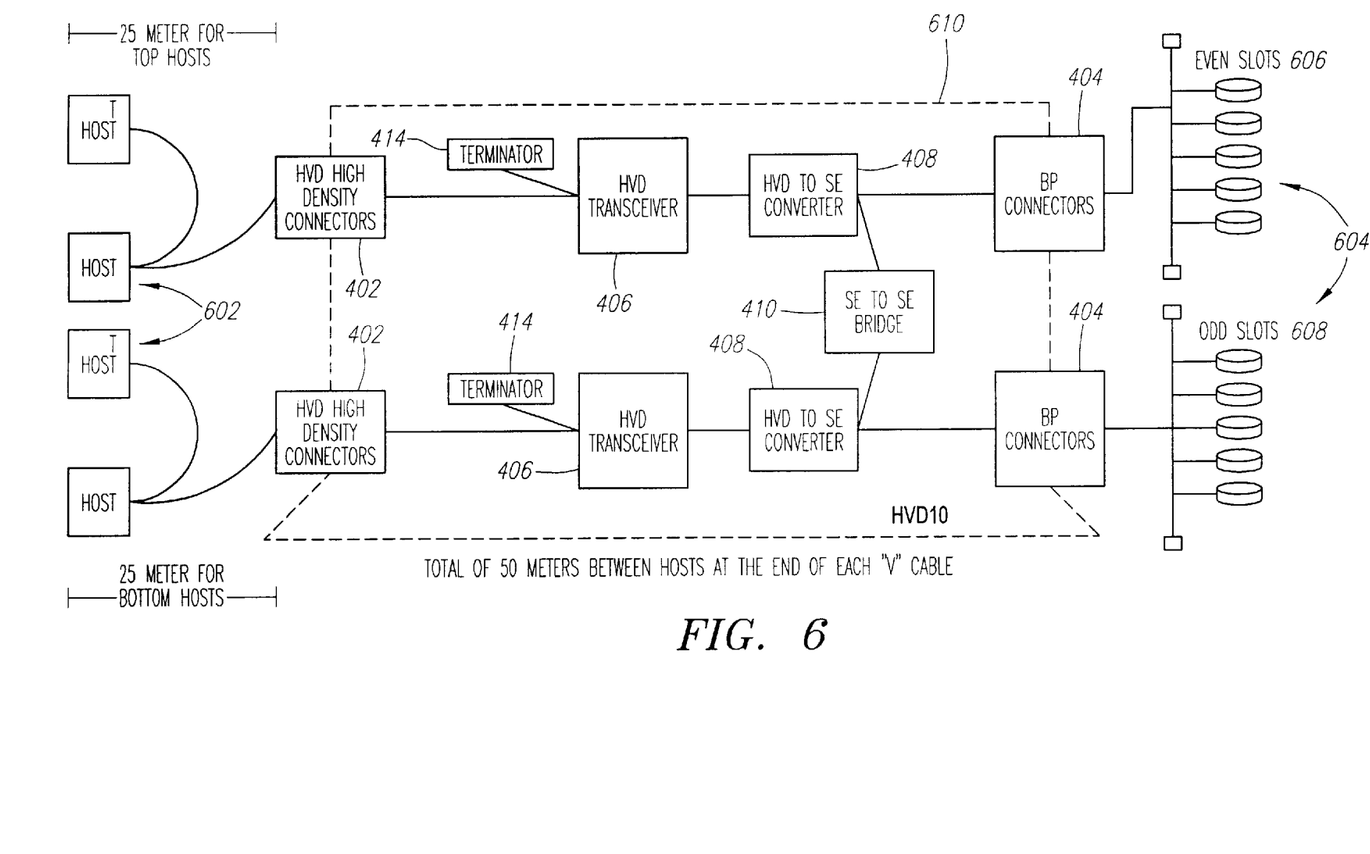
FIG. 6 is a schematic block diagram showing an example of a storage system that uses a HVD bus controller card (BCC) to connect multiple host computers to multiple storage units.

Referring to FIG. 6, a schematic block diagram illustrates an example of a storage system 600 that uses a HVD bus controller card (BCC) 610 to connect multiple host computers 602 to multiple storage units 604. Some of the storage units 604 are connected to even bus slots 606 and some to odd bus slots 608. The BCC 610 uses the internal bridge 410 to connect the even buses 606 and the odd buses 608 on a backplane. The BCC 610 can be configured in Full Bus, called Bridged, Mode to allow up to four hosts 602 to connect to the SCSI bus with an extended cabling distance of up to 25 meters for the host computers 602 and bus isolation. Cable length between the host 602 and the enclosure are thus increased. The connection is considered a point-to-point connection allowing the full 25 meters between the host 602 and the enclosure. Thus, hosts 602 connecting to each front-end connector can be up to 50 meters apart.

The internal bridge 410 can be disabled, resulting in a split-bus configuration limiting access to two hosts 602 per bus 606 or 608 with a maximum of five storage units 604 per bus.

A second HVD BCC can be added when the system is connected using the SCSI disk enclosure 100 shown in FIG.

1, increasing the host connect rate and supplying redundancy. No in-line terminators are necessary to disconnect a host 602 from the system 600.

Figure 7:
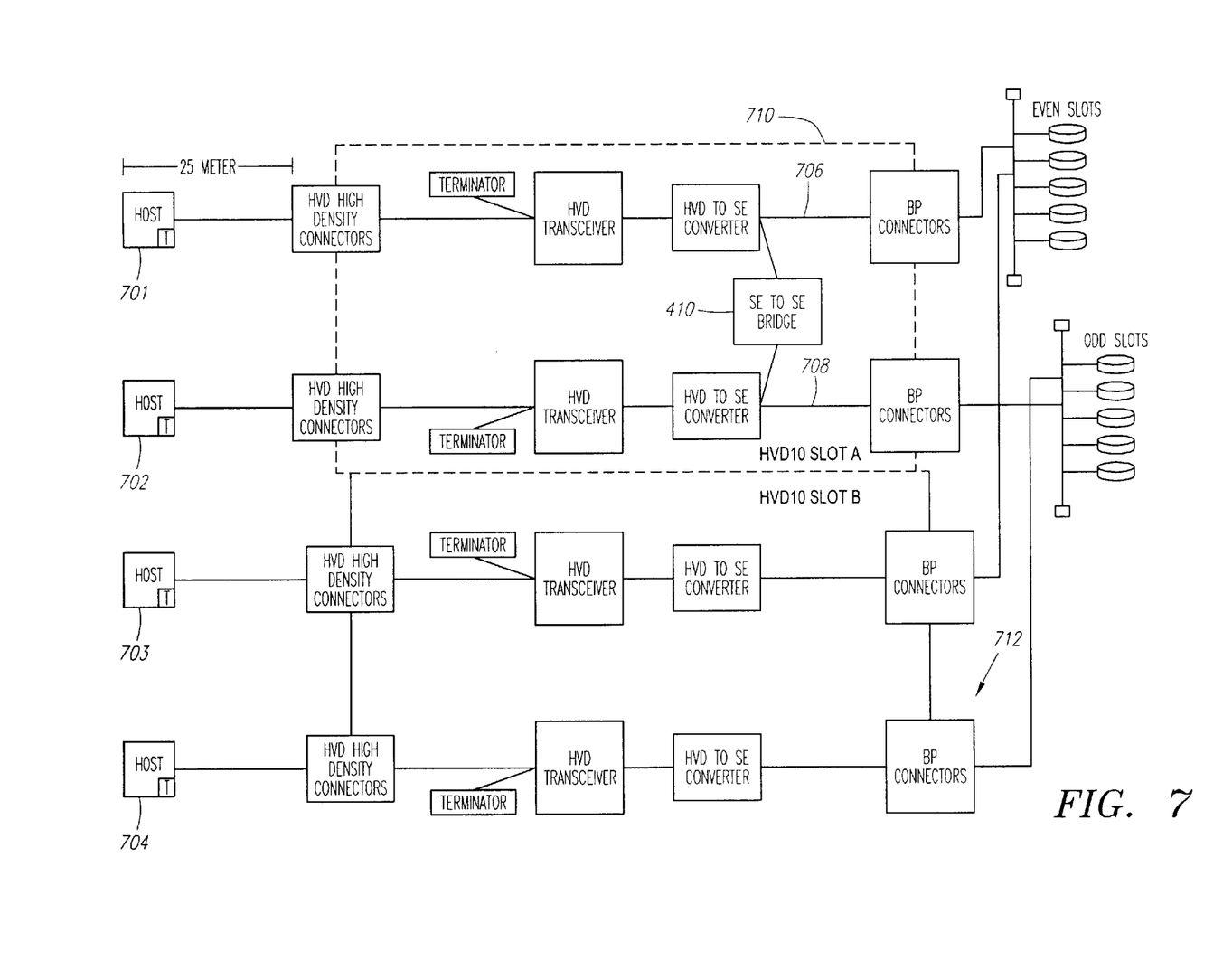
FIG. 7 is a schematic block diagram that shows a bus configuration constructed using two HVD bus controller cards.

The bus controller cards shown in FIGS. 5 and 6 form a building-block for a pseudo-redundant architecture in a single SCSI disk enclosure 100 (FIG. 1). When a second BCC is added to the enclosure, as shown in FIG. 7, a failed BCC can be removed without affecting the operation of the remaining BCC. FIG. 7 shows a bus configuration 700 constructed using two HVD bus controller cards 710 and 712. Two host computers 701 and 702 are connected to the HVD BCC 710 having the internal bridge 410 enabled between the even bus 706 and the odd bus 708. Two host computers 703 and 704 are connected to the HVD BCC 712 that is configured in a split-bus mode.

When the internal bridge 410 is enabled on a first card, for example the bus controller card 710, then the internal bridge on the second card, bus controller card 712, must be disabled to avoid data corruption on the bus due to bus looping. Host computers connected to either bus controller card still have access to both buses since one internal bridge is enabled. In one example, host computers connected to HVD BCC 712 retain access to all drives on both buses because the internal bridge 410 on the HVD BCC 710 is enabled. If a connection is desired in which host computers only have access to disks on one bus then both BCCs 710 and 712 are configured in "split bus" mode.

Figure 8:
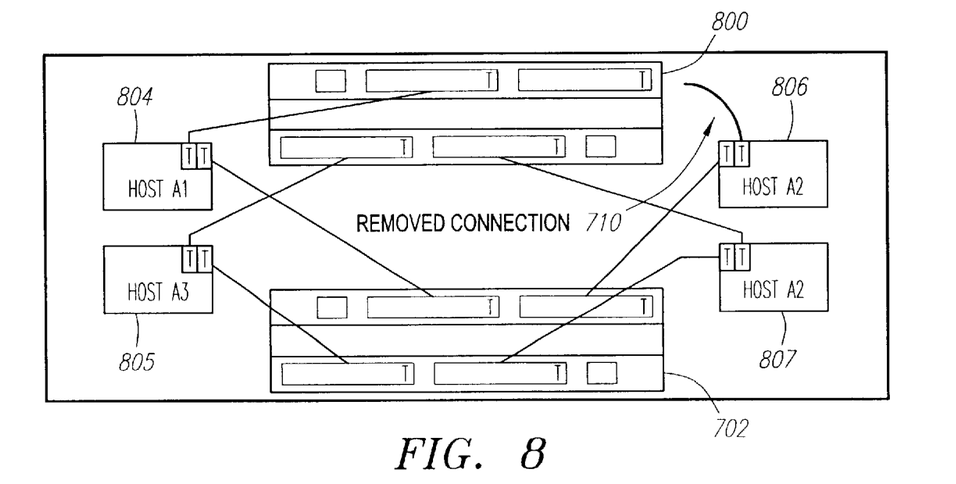
FIG. 8 is a schematic pictorial diagram that illustrates connection panels of two SCSI disk enclosures and four host computers, including interconnects and a removed connection.

Referring to FIG. 8, a schematic pictorial diagram illustrates connection panels of two SCSI disk enclosures 800 and 802, and four host computers 804, 805, 806, and 807. Interconnections show that the two SCSI disk enclosures 800 and 802 each contain two bus controller cards interconnected with mirroring so that connections between host computers and storage units (not shown) are redundant. HVD bus controller cards can be configured in split-bus or full bus mode, and connections made to the HVD BCCs can be removed or shut down without affecting the other connections. In the illustrative example, a removed connection 810 from the SCSI disk enclosure 800 to host 806 is removed without affecting other connections.

The diagram illustrates bus termination by the letter T. All SCSI buses require termination on the device at each end of the bus. Termination on the storage system occurs at BCC ports. Disk modules utilized in the storage system are connected to an internal self-terminated bus that is electrically isolated from the external bus.

Figure 9:
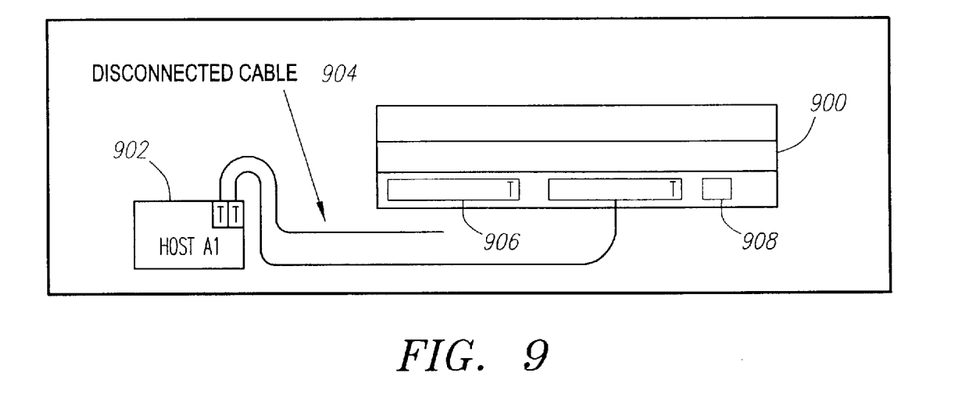
FIG. 9 is a schematic pictorial diagram that illustrates connection panels of a SCSI disk enclosure and a host computer including a removed connection from an HVD port.

Referring to FIG. 9, a schematic pictorial diagram illustrates connection panels of a SCSI disk enclosure 900 in which only a single bus controller card is installed, and a host computer 902 including a removed connection 904 from an HVD port 906. The internal termination 414 shown in FIG. 4 replaces external termination that is required for non-isolated architectures. The internal termination 414 remains functional if access to the SCSI bus is denied due to improper configuration or even if the entire SCSI disk enclosure 100 is powered off. Internal termination 414 can be disabled via a DIP switch 908 on the bulkhead of the bus controller card. The two independent bus paths of a BCC within the SCSI disk enclosure 900, and controlled isolation and termination on the BCC allow connections to each front-end connector to be removed or added without disturbing functionality of connections to the other front-end connector.

Figure 10:
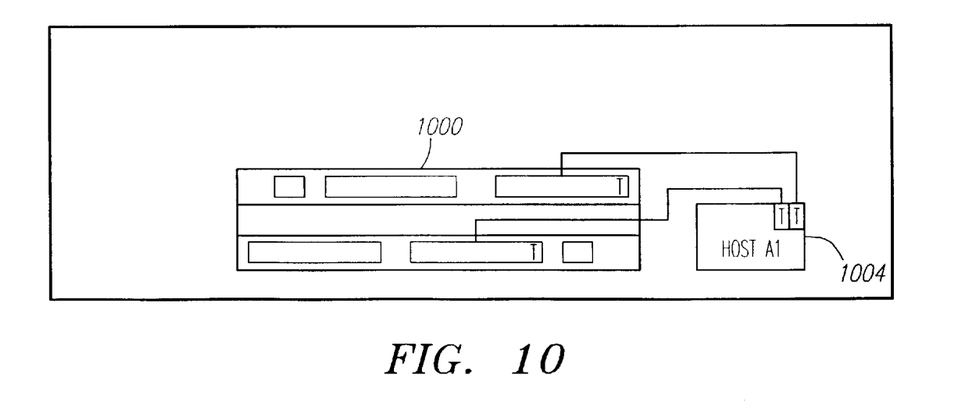
FIG. 10 is a schematic pictorial diagram illustrates connection panels of a SCSI disk enclosure and a host computer, showing a redundant connection to the single host.

Referring to FIG. 10, a schematic pictorial diagram illustrates connection panels of a SCSI disk enclosure 1000 and a host computer 1004, showing a redundant connection to the single host 1004. The SCSI disk enclosure 1000 includes two BCC slots to support redundant BCCs to a single host or to multiple hosts. The redundant connection to a single host 1004 can be configured so that one BCC is active while the other is inactive, and to exchange status if desired or if problems occur along one pathway. The redundant connection to a single host can otherwise be configured to connect each independent bus, increasing performance.

Figure 11:
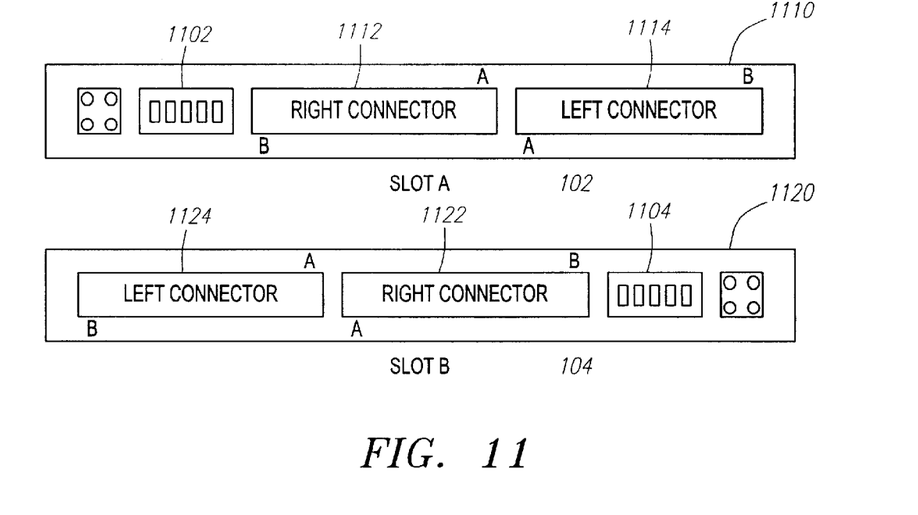
FIG. 11 is a schematic pictorial diagram showing a connection panel for the SCSI disk enclosure including left and right connectors and DIP switches.

Referring to FIG. 11, a schematic pictorial diagram illustrates a connection panel for the SCSI disk enclosure 100 including left and right connectors and DIP switches. DIP switches 1102 and 1104 are used to control the configuration of the SCSI disk enclosure 100. Two BCCs are connected within the SCSI disk enclosure 100 rotated 180° with respect to one another. Stated alternatively, one BCC is inverted in comparison to the other BCC within the SCSI disk enclosure 100. Consequently, a BCC's connectors connect to the odd bus in one slot, and connect to the even bus in the second slot. Accordingly, a one-to-one relationship does not exist between the BCC connectors and the BCC DIP switches. FIG. 11 depicts the inverted orientation of the connectors 1112 and 1114 of slot A 1110 with respect to the connectors 1122 and 1124 of slot B 1120. The BCC connectors are associated with the SCSI buses and slots so that the left BCC connector is connected in slot A 1110 and associated with the even slots of SCSI bus B. The left BCC connector is connected in slot B 1120 an associated with the odd slots of SCSI bus A. The right BCC connector is connected in slot A 1110 and associated with the odd slots of SCSI bus A. The right BCC connector is connected in slot B 1120 and associated with the even slots of bus B.

Figure 12:
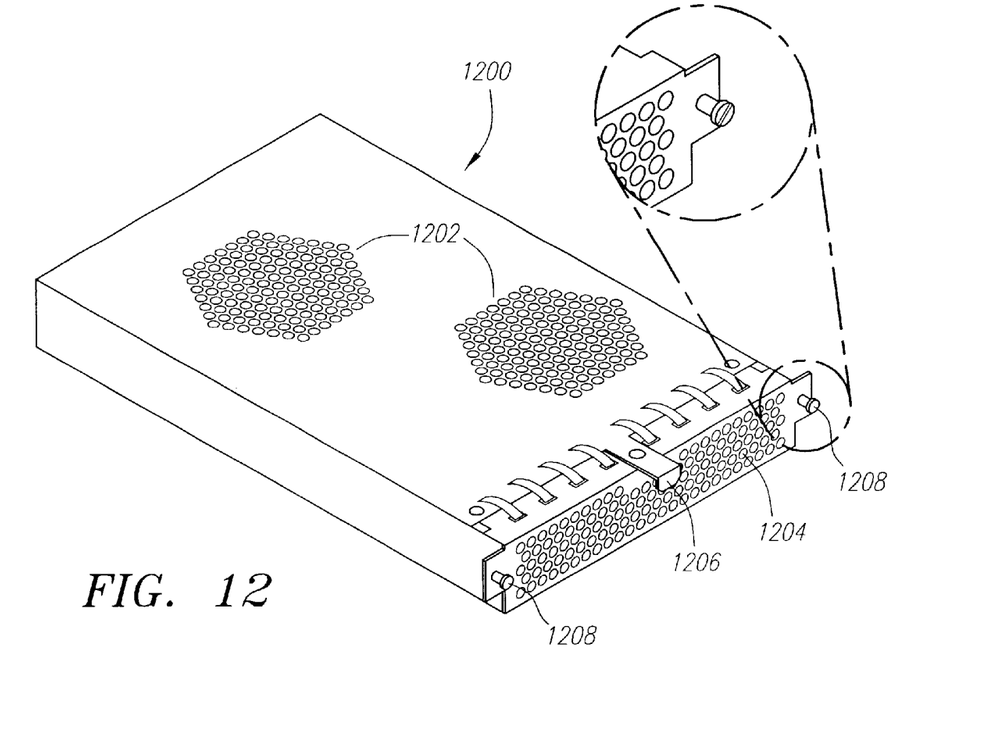
FIG. 12 is a pictorial diagram that shows a fan for insertion into the SCSI disk enclosure.

Referring to FIG. 12, a pictorial diagram illustrates a fan 1200 for insertion into the SCSI disk enclosure 100. The fan blows cooling air over system components using two internal high-speed blowers 1202. The fan 1200 includes an LED 1204, a pull tab 1206, and two locking screws 1208. Internal circuitry (not shown) senses blower motion and triggers a fault when the speed of either blower 1202 falls below a critical level, actuating the LED 1204.

Figure 13:
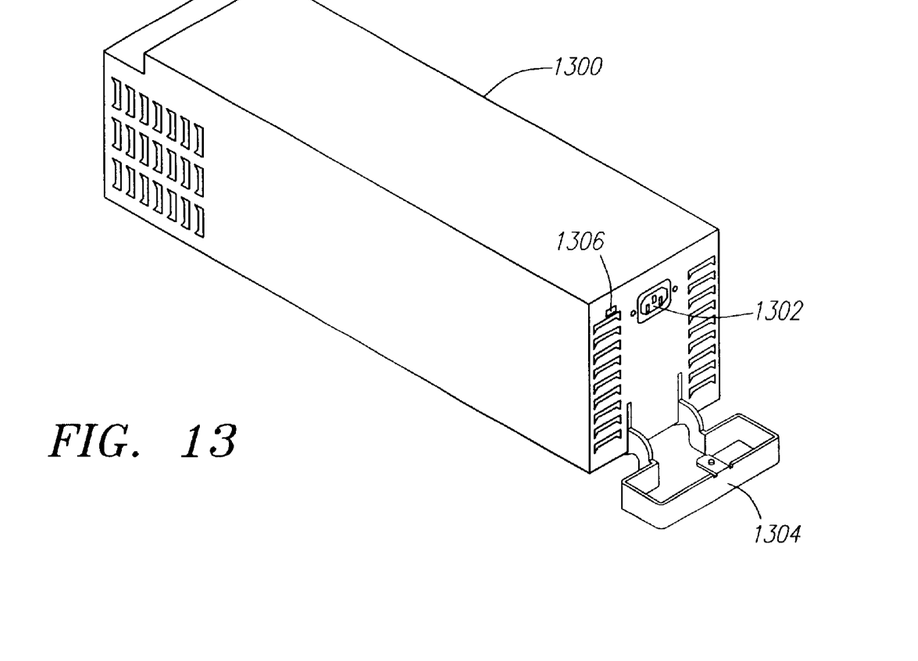
FIG. 13 is a pictorial diagram depicting a power supply for insertion into the SCSI disk enclosure.

Referring to FIG. 13, a pictorial diagram illustrates a power supply 1300 for insertion into the SCSI disk enclosure 100. A hot-pluggable 450-watt power supply converts wide-ranging AC voltage from an external main to stable DC output and delivers the voltage to the backplane. The power supply 1300 has two internal blowers (not shown), an AC receptacle 1302, a cam handle 1304 with locking screw, and an LED 1306. Internal control circuits prevent the rear DC connector from becoming energized when the power supply 1300 is removed from the SCSI disk enclosure 100.

Internal circuitry triggers a fault when a blower or other power supply component fails. The power supply LED 1306 lights to signal the fault. Blowers remain in operation if other parts fail to maintain cooling air flow through the disk system. If a blower fails, the power supply 1300 shuts down. Optional redundant power supplies share the load reciprocally. Each supply automatically increases output voltage to compensate for reduced voltage output from the other. If one power supply fails, the other delivers the entire load.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed

What is claimed is:

1. An interface card comprising:
   a plurality of bus paths, each bus path extending from a first connector to a second connector, the second connector for coupling to bus backplane; one or more of the bus paths including:
      a transceiver that accesses signals in a first bus signaling type;
      an isolator/converter that mutually isolates the plurality of bus paths and that converts signals from the first bus signaling type to a second bus signaling type; and
      a bridge coupled from a first bus path to a second bus path of the plurality of bus paths, the bridge being capable of controlling communication of signals between the first bus path and the second bus path.

2. An interface card according to claim 1 wherein:
   the one or more bus paths further include:
      a terminator coupled to the bus path.

3. An interface card according to claim 1 wherein:
   the one or more bus paths further include:
      a terminator coupled to the transceiver.

4. An interface card according to claim 1 wherein:
   the bus is a Small Computer System Interface (SCSI) bus;
   the first bus signaling type is a high voltage differential (HVD) signaling type; and
   the second bus signaling type is a single-ended (SE) signaling type.

5. An interface card according to claim 1 wherein:
   the one or more bus paths further include:
      a high density connector coupled to the bus path adjacent the transceiver; and
      a backplane connector coupled to the bus path adjacent the isolator/converter.

6. An interface card according to claim 5 wherein:
   the bus is a Small Computer System Interface (SCSI) bus;
   the first bus signaling type is a high voltage differential (HVD) signaling type;
   the second bus signaling type is a single-ended (SE) signaling type;
   the transceiver is a HVD transceiver;
   the isolator/converter is a HVD to SE isolator/converter;
   the bridge is an SE to SE bridge;
   the high density connector is an HVD high density connector.

7. An interface card according to claim 1 wherein:
   the one or more bus paths further include:
      a high density connector coupled to the bus path adjacent the transceiver, connections to the high density connector of a first bus path being removable or connectable to the high density connector without disturbing functionality of another bus path.

8. An interface card according to claim 1 wherein:
   the one or more bus paths further include;
      a terminator coupled to the transceiver, the terminator being operational when the bus interface card is either powered or unpowered.

9. An interface card according to claim 1 wherein:
   the interface card is a bus controller card.

10. A dual-channel bus controller card comprising:
    a first bus path extending from a host end to a backplane end, the first bus path including:
       a first high density connector coupled to the host end of the first bus path;
       a first transceiver coupled to the first bus path adjacent to the first high density connector;
       a first isolator/converter coupled to the first bus path adjacent to the first transceiver; and
       a first backplane connector coupled to the backplane end of Sac first bus path and adjacent to the first isolator/converter; and
    a second bus path extending from a host end to a backplane end, the second bus path including:
       a second high density connector coupled tot he host end of the second bus path;
       a second transceiver coupled to the second bus path adjacent to the second high density connector;
       a second isolator/converter coupled tot the second bus path adjacent to the second transceiver; and
       a second backplane connector coupled to the backplane end of the second bus path and adjacent to the second isolator/converter.

11. A dual-channel bus controller card according to claim 10 further comprising:
    a first terminator coupled to the first transceiver; and
    a second terminator coupled to the second transceiver.

12. A dual-channel bus controller card according to claim 10 further comprising:
    a first terminator coupled to the first transceiver; and
    a second terminator coupled to the second transceiver, tie first and second terminators
       being operational when the bus interface card is either powered or unpowered.

13. A dual-channel bus controller card according to claim 10 wherein:
    connections to the first high density connector of the first bus path are removable or
       connectable to the first high density connector without disturbing functionality of the second bus path.

14. A dual-channel bus controller card according to claim 10 further comprising:
    a bridge coupled to the first bus path and to the second bus path, the bridge capable of controlling data communication between the first bus path and the second bus path.

15. A dual-channel bus controller card according to claim 10 wherein:
    the first and second isolator/converters convert from a first bus signaling type to a second bus signaling type.

16. A dual-channel bus controller card according to claim 10 wherein:
    the bus is a Small Computer System Interface (SCSI) bus;
    the first and second isolator/converters convert from a high voltage differential (HVD) signaling type to a single-ended (SE) signaling type.

17. An interface apparatus comprising:

a plurality of data paths, each data path extending from a first connector to a second connector, the second connector for coupling to a bus backplane;

one or more of the data paths including:
- means for accessing signals in a first bus signaling type;
- means for mutually isolating the plurality of data paths;
- means for converting signals from the first bus signaling type to a second bus signaling type; and
- means for controlling communication of signals between the first data path and the second data path.

18. An interface apparatus according to claim 17 wherein:

the data path is selected from among a group including a data bus, a single serial data line, and multiple independent serial data lines.

19. An interface apparatus according to claim 17 wherein:

the one or more data paths farther include: means for terminating the data lines.

20. An interface apparatus according to claim 17 wherein:

the one or more data paths further include:
- a high density connector coupled to the data path adjacent the transceiver; and
- a backplane connector coupled to the data path adjacent the isolator/converter.

21. An interface apparatus according to claim 17 wherein:

the data paths are Small Computer System Interface (SCSI) buses;

the first bus signaling type is a high voltage differential (HVD) signaling type;

the second bus signaling type is a single-ended (SE) signaling type;

the means for accessing signals is a HVD transceiver;

the isolating and converting means are included in a HVD to SE isolator/converter; and the communication controlling means is an SE to SE bridge.

22. An interface card according to claim 1 wherein:

each of the first connectors has an isolated path to each bus on the backplane and each isolated path has a termination on the interface card.

23. An interface card according to claim 1 wherein:

the bridge is coupled from the first bus path to the second bus path to selectively configure the bus in either a full-bus or a split-bus configuration.

24. An interface card according to claim 1 wherein:

the bridge is internal to the interface card and supports dynamic transmission mode changes by notifying initiators of changes in transmission mode.

25. A dual-channel bus controller card according to claim 10 wherein:

each high density connector is coupled to an isolated path to each bus on the backplane so that termination is present on the bus controller card.

26. A dual-channel bus controller card according to claim 10 further comprising:

a bridge coupled to the first bus path and to the second bus path, the bridge being internal to the bus controller card and supporting dynamic transmission mode changes by notifying initiators of changes in transmission mode.

27. An interface apparatus according to claim 17 wherein:

each first connector of the plurality of first connectors is coupled to an isolated data path of the plurality of data paths.

28. An interface card according to claim 17 wherein:

the means for controlling communication is coupled from a first data path to a second data path to selectively configure the bus in either a full-bus or a split-bus configuration.

* * * * *